United States Patent
Jung et al.

(10) Patent No.: US 12,540,901 B2
(45) Date of Patent: Feb. 3, 2026

(54) APPARATUS FOR ESTIMATING CONCENTRATION OF BIOMARKER, AND ELECTRONIC DEVICE INCLUDING THE SAME

(71) Applicants: SAMSUNG ELECTRONICS CO., LTD., Suwon-si (KR); Arizona Board of Regents on behalf of Arizona State University, Scottsdale, AZ (US)

(72) Inventors: Won Jong Jung, Seoul (KR); Di Wang, Hangzhou (CN); Vishal Varun Tipparaju, Arlington, MA (US); Xiaojun Xian, Chandler, AZ (US); Jingjing Yu, Tempe, AZ (US); Kak Namkoong, Seoul (KR)

(73) Assignees: SAMSUNG ELECTRONICS CO., LTD., Suwon-si (KR); Arizona Board of Regents on behalf of Arizona State University, Scottsdale, AZ (US)

( * ) Notice: Subject to any disclaimer, the term of this patent is extended or adjusted under 35 U.S.C. 154(b) by 964 days.

(21) Appl. No.: 17/684,968

(22) Filed: Mar. 2, 2022

(65) Prior Publication Data
US 2022/0357280 A1 Nov. 10, 2022

Related U.S. Application Data

(60) Provisional application No. 63/183,870, filed on May 4, 2021.

(30) Foreign Application Priority Data
Jun. 3, 2021 (KR) .................. 10-2021-0071960

(51) Int. Cl.
*G01N 21/78* (2006.01)
*G01N 21/25* (2006.01)
(Continued)

(52) U.S. Cl.
CPC .............. *G01N 21/78* (2013.01); *G01N 21/25* (2013.01); *G01N 33/50* (2013.01); *A61B 5/083* (2013.01);
(Continued)

(58) Field of Classification Search
CPC ................... G01N 21/78; G01N 21/25; G01N 2021/7763; G01N 2201/0221;
(Continued)

(56) References Cited

U.S. PATENT DOCUMENTS 6,402,795 B1 6/2002 Chu et al.
6,485,622 B1 11/2002 Fu
(Continued)

FOREIGN PATENT DOCUMENTS

CN 210541509 U 5/2020
JP 200925290 A 2/2009
(Continued)

OTHER PUBLICATIONS

Lin, C., et al., "Gradient-Based Colorimetric Sensors for Continuous Gas Monitoring", Anal. Chem., 2018, vol. 90, No. 8, pp. 5375-5380.
(Continued)

*Primary Examiner* — Jill A Warden
(74) *Attorney, Agent, or Firm* — Sughrue Mion, PLLC

(57) ABSTRACT

An apparatus for estimating a concentration of a biomarker, may include: an inlet configured to receive the biomarker of an object; a chamber configured to store the biomarker; a sensor cartridge comprising a measurement channel provided as a porous substrate, the measurement channel comprising a probe which is disposed in each pore of the porous substrate and changes in color upon reaction with the biomarker; a light source configured to emit light onto the measurement channel; a detector configured to detect the
(Continued)

light incident from the measurement channel; and a processor configured to obtain color change information of the measurement channel based on the light detected by the detector, and estimate the concentration of the biomarker based on the color change information.

17 Claims, 21 Drawing Sheets

(51) Int. Cl.
  *G01N 33/50* (2006.01)
  *A61B 5/083* (2006.01)
  *G01J 1/08* (2006.01)
  *G01J 3/46* (2006.01)
  *G01N 21/49* (2006.01)

(52) U.S. Cl.
  CPC ....... *A61B 2560/00* (2013.01); *A61B 2562/00* (2013.01); *G01J 1/08* (2013.01); *G01J 3/46* (2013.01); *G01N 2021/495* (2013.01); *G01N 2201/1235* (2013.01); *G01N 2291/0245* (2013.01); *G01N 2291/02466* (2013.01); *G01N 2291/0255* (2013.01); *G01N 2291/0256* (2013.01)

(58) Field of Classification Search
  CPC ........... G01N 2201/1235; G01N 33/52; G01N 33/50; G01N 33/00; G01J 1/08; G01J 3/46
  See application file for complete search history.

(56) References Cited

U.S. PATENT DOCUMENTS

| | | | |
|---|---|---|---|
| 7,449,146 B2 | 11/2008 | Rakow et al. | |
| 7,901,658 B2 | 3/2011 | Weppner et al. | |
| 8,506,902 B2 | 8/2013 | Rakow et al. | |
| 8,828,580 B2 | 9/2014 | Visco et al. | |
| 10,736,551 B2 | 8/2020 | Rogers | |
| 10,782,284 B1* | 9/2020 | Ahmad et al. | G01N 33/497 73/23.3 |
| 11,064,946 B2 | 7/2021 | Rogers et al. | |
| 11,160,458 B2 | 11/2021 | Rogers et al. | |
| 2004/0062682 A1 | 4/2004 | Rakow et al. | |
| 2007/0179373 A1* | 8/2007 | Pronovost | G01N 21/78 600/362 |
| 2008/0004542 A1* | 1/2008 | Allen et al. | C12P 7/28 600/532 |
| 2008/0317628 A1 | 12/2008 | Ishibashi et al. | |
| 2014/0303462 A1 | 10/2014 | Ellenberger-Girard et al. | |
| 2016/0120458 A1 | 5/2016 | Yamada et al. | |
| 2016/0282352 A1 | 9/2016 | Martino et al. | |
| 2018/0006326 A1 | 1/2018 | O'Neill et al. | |
| 2018/0356501 A1* | 12/2018 | Send | G01S 11/12 |
| 2019/0094146 A1 | 3/2019 | Tao et al. | |
| 2020/0158680 A1 | 5/2020 | Hagen et al. | |
| 2020/0328459 A1 | 10/2020 | Sakai et al. | |
| 2020/0338558 A1* | 10/2020 | Dasgupta | B01L 3/52 |
| 2020/0345279 A1 | 11/2020 | Rogers et al. | |
| 2021/0000390 A1 | 1/2021 | Rogers | |
| 2021/0000395 A1 | 1/2021 | Rogers et al. | |

FOREIGN PATENT DOCUMENTS

| | | | | |
|---|---|---|---|---|
| JP | 2014232051 A | 12/2014 | | |
| KR | 1020070011392 A | 1/2007 | | |
| KR | 1020170041291 A | 4/2017 | | |
| WO | WO2016049571 A1 * | 3/2016 | | A61K 51/00 |
| WO | 2017139843 A1 | 8/2017 | | |
| WO | 2019135319 A1 | 7/2019 | | |

OTHER PUBLICATIONS

Yamada, Y., et al., "Ultratrace Measurement of Acetone from Skin Using Zeolite: Toward Development of a Wearable Monitor of Fat Metabolism", Analytical Chemistry, 2015, vol. 87, pp. 7588-7594.
World Health Organization, "Diet, nutrition, and the prevention of chronic diseases: report of a joint WHO/FAO expert consultation", vol. 916. World Health Organization, 2003, pp. 1-149 (160 pages).
Lupton, J., "Dietary Reference Intakes For Energy, Carbohydrate, Fiber, Fat, Fatty Acids, Cholesterol, Protein, and Amino Acids", Institute of Medicine, National Academies Press, 2002/2005, 4 pages.
Combs, G., et al., "Biomarkers in nutrition: new frontiers in research and application", Annals of the New York Academy of Sciences, 2013, vol. 1278, pp. 1-10.
Basiotis, P., et al., "Number of Days of Food Intake Records Required to Estimate Individual and Group Nutrient Intakes with Defined Confidence", American Institute of Nutrition, 1987, pp. 1638-1641 (5 pages).
Natarajan, L., et al., "Measurement Error of Dietary Self-Report in Intervention Trials", Practice of Epidemiology, vol. 172, No. 7, 2010, pp. 819-827.
Hedrick, V., et al., "Dietary biomarkers: advances, limitations and future directions", Nutrition Journal, vol. 11, No. 109, 2012, pp. 1-14.
Potischman, N., "Biologic and Methodologic Issues for Nutritional Biomarkers", Biomarkers of Nutritional Exposure and Nutritional Status, vol. 133.3, 2003, pp. 875S-880S.
Havlicek, J., et al., "The Effect of Diet on Human Bodily Odors", Nova Science Publishers, Inc., 2009, pp. 35-44.
Ajibola, O., et al., "Effects of dietary nutrients on volatile breath metabolites", Journal of Nutritional Science, vol. 2, e34, 2013, pp. 1-15.
Prabhakar, A., et al., "Breath Acetone as Biomarker for Lipid Oxidation and Early Ketone Detection", Global Journal of Obesity, Diabetes and Metabolic Syndrome, 2014, pp. 1-8 (012-019).
Nose, K., et al., "Identification of Ammonia in Gas Emanated from Human Skin and Its Correlation with That in Blood", Analytical Sciences, 2005, vol. 21, pp. 1471-1474.
Amann, A., et al., "The human volatilome: volatile organic compounds (VOCs) in exhaled breath, skin emanations, urine, feces and saliva", Journal of Breath Research, vol. 8, No. 3, 2014, pp. 1-17 (18 pages).
Yamane, N., et al., "Relationship between skin acetone and blood β-hydroxybutyrate concentrations in diabetes" Clinica Chimica Acta, vol. 365, 2006, pp. 325-329.
Takaharu, K., "Assessment of colonic fermentation by hydrogen release from skin", The American journal of gastroenterology, vol. 97, No. 5, 2002, p. 1271.
King, J., et al., "Dynamic profiles of volatile organic compounds in exhaled breath as determined by a coupled PTR-MS/GC-MS study", Physiological Measurement, vol. 31, 2010, pp. 1169-1184 (17 pages).
Gong, I., et al., "Atmospheric ammonia measurements in Houston, TX using an external-cavity quantum cascade laser-based sensor", Atmospheric Chemistry and Physics, vol. 11, No. 18, 2011, pp. 9721-9733.
"Drager-Tube/CMS Handbook: Handbook for Short Term Measurements in Soil, Water and Air Investigations As Well As Technical Gas Analysis", 18th ed.; Dräger Safety AG & Co., KgaA, Lübeck, 2018, pp. 1-450 (452 pages).

* cited by examiner

APPARATUS FOR ESTIMATING CONCENTRATION OF BIOMARKER, AND ELECTRONIC DEVICE INCLUDING THE SAME

CROSS-REFERENCE TO RELATED APPLICATION(S)

This application claims priority from Korean Patent Application No. 10-2021-0071960, filed on Jun. 3, 2021 in the Korean Intellectual Property Office, which claims priority from U.S. Provisional Patent Application No. 63/183,870, filed on May 4, 2021, in the U.S. Patent and Trademark Office, the entire disclosures of which are incorporated herein by reference in their entireties.

BACKGROUND

1. Field

Apparatuses and methods consistent with example embodiments relate to estimating a concentration of a biomarker.

2. Description of the Related Art

With the development of medical science and a longer average life span, there is a growing interest in medical devices, ranging from large medical devices for use in hospitals or medical examination institutions, to small medical devices and healthcare devices that individuals can carry with them. Medical devices for measuring bio-information are generally divided into invasive type devices and non-invasive type devices. The non-invasive type device has an effect of simply detecting bio-information without causing pain to a subject, but has a drawback in that accuracy of the measurement result is low. Accordingly, various studies are conducted to overcome such drawback.

SUMMARY

According to an aspect of an example embodiment, there is provided an apparatus for estimating a concentration of a biomarker, the apparatus including: an inlet configured to receive the biomarker of an object; a chamber configured to store the biomarker; a sensor cartridge including a measurement channel provided as a porous substrate, the measurement channel comprising a probe which is disposed in each pore of the porous substrate and changes in color upon reaction with the biomarker; a light source configured to emit light onto the measurement channel; a detector configured to detect the light incident from the measurement channel; and a processor configured to obtain color change information of the measurement channel based on the light detected by the detector, and estimate the concentration of the biomarker based on the color change information.

The inlet may include a hole provided to be contacted by the object, or a permeable membrane configured to selectively transmit the biomarker to be measured.

The apparatus may further include a slot into which the sensor cartridge is inserted or from which the sensor cartridge is removed, and configured to guide the sensor cartridge to the chamber when the sensor cartridge is inserted into the slot.

The slot may extend toward a side surface of the chamber.

The processor may be further configured to obtain a color change speed of the measurement channel based on a distance between a first position and a second position in the measurement channel, at each of which a reference absorbance is detected, and a time difference between a first detection time of the first position and a second detection time of the second position.

The slot may be provided above the chamber so that the sensor cartridge that is inserted into the slot is disposed above the chamber.

The processor may be further configured to obtain a variation in absorbance of the measurement channel based on a quantity of light detected from the measurement channel and a quantity of light detected from a reference channel.

The measurement channel may include a plurality of measurement channels, each of which reacts with different biomarkers.

The porous substrate may include at least one of silica, alumina, polymer, and molecular sieve.

The biomarker may include at least one of acetone, ammonia, carbon dioxide, and hydrogen.

The processor may be further configured to estimate a physiological status comprising at least one of nutrient intake status, metabolic status, exercise status, calorie intake, and calorie consumption.

The apparatus may further include a display configured to display at least one of the concentration of the biomarker and the physiological status.

The apparatus may further include at least one of a humidity sensor configured to measure humidity, and a temperature sensor configured to measure temperature.

According to an aspect of an example embodiment, there is provided an apparatus for estimating a concentration of a biomarker, the apparatus including: a patch-type sensor configured to be attached to an object and react with the biomarker, and including a contact surface configured to be contacted by the object, a sensor cartridge disposed above the contact surface and comprising a measurement channel provided as a porous substrate, the measurement channel comprising a probe which is disposed in each pore of the porous substrate and changes in color upon reaction with the biomarker, and a hole provided at the contact surface and the sensor cartridge, to receive the biomarker; a light source configured to emit light onto the patch-type sensor; a detector configured to detect light incident from the patch-type sensor; and a processor configured to obtain color change information of the patch-type sensor based on the detected light, and estimate the concentration of the biomarker based on the obtained color change information.

The processor may be further configured to obtain a color change speed of the measurement channel based on a distance between a first position and a second position in the measurement channel, at each of which a reference absorbance is detected, and a time difference between a first detection time of the first position and a second detection time of the second position.

The processor is further configured to obtain the color change speed of the measurement channel based on a first distance between the first position and the second position, and a second distance between a third position and a fourth position in the measurement channel, at each of which the reference absorbance is detected when the sensor cartridge reacts with the biomarker introduced through an outer edge of the sensor cartridge.

The processor may be further configured to calculate a statistical value of the first distance and the second distance, and obtain the color change speed based on statistical value of the first distance and the second distance.

The processor may be further configured to measure a variation in absorbance of the measurement channel based on a quantity of light detected at a predetermined reference point of the patch-type sensor and a quantity of light detected from the measurement channel.

The apparatus may further include a transparent cover surface disposed above the contact surface, wherein the transparent cover surface may include marker lines formed so that at least one of a position of the measurement channel and the color change information is visually identified.

According to an aspect of an example embodiment, there is provided an electronic device including: an inlet provided to be contacted by an object, and through which a biomarker of the object is introduced; a chamber configured to store the biomarker; a sensor cartridge comprising a measurement channel provided as a porous substrate, the measurement channel comprising a probe which is disposed in each pore of the porous substrate and changes in color upon reaction with the biomarker; a slot configured to guide the sensor cartridge to the chamber when the sensor cartridge is inserted into the slot; a light source configured to emit light onto the measurement channel; a detector configured to detect the light incident from the measurement channel; and a processor configured to obtain color change information of the measurement channel based on the light detected by the detector, and estimate a concentration of the biomarker based on the color change information.

Figure 1A:
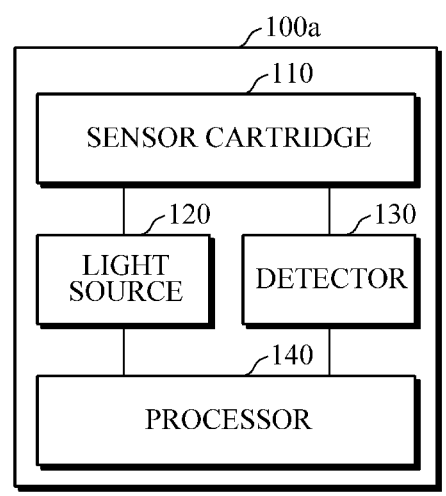
FIG. 1A is a block diagram illustrating an apparatus for estimating a concentration of a biomarker according to an embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

It will be understood that, although the terms first, second, etc. may be used herein to describe various elements, these elements should not be limited by these terms. These terms are only used to distinguish one element from another. Also, the singular forms are intended to include the plural forms as well, unless the context clearly indicates otherwise. It will be further understood that when an element is referred to as "comprising" another element, the element is intended not to exclude one or more other elements, but to further include one or more other elements, unless explicitly described to the contrary. In the following description, terms such as "unit" and "module" indicate a unit for processing at least one function or operation and they may be implemented by using hardware, software, or a combination thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

FIG. 1A is a block diagram illustrating an apparatus for estimating a concentration of a biomarker according to an embodiment of the present disclosure. Various embodiments of the apparatus 100a for estimating a concentration of a biomarker may be mounted in a wearable device, a smart phone, a tablet PC, a desktop computer, a laptop computer, and the like. In this case, examples of the wearable device may include a wristwatch-type wearable device, a bracelet-type wearable device, a wristband-type wearable device, a ring-type wearable device, a glasses-type wearable device, a headband-type wearable device, etc., but the wearable device is not limited thereto, and may be mounted in various types of hardware devices for use in specialized medical institutions.

Referring to FIG. 1A, the apparatus 100a for estimating a concentration of a biomarker includes a sensor cartridge 110, a light source 120, a detector 130, and a processor 140.

The sensor cartridge 110 may be replaceable, and may be made of, for example, a paper-based material. The sensor cartridge 110 may include one or more measurement channels reacting with a biomarker of an object. Each measurement channel is formed as a porous substrate, and each pore includes a probe which changes in color upon reaction with the biomarker. The biomarker is a gas generated from a user's object, e.g., a user's wrist, and may include at least one of acetone, ammonia, carbon dioxide, and hydrogen, but is not limited thereto.

A structure of the sensor cartridge 110 and the measurement channel will be described below with reference to FIGS. 2A to 2C.

Figure 2A:
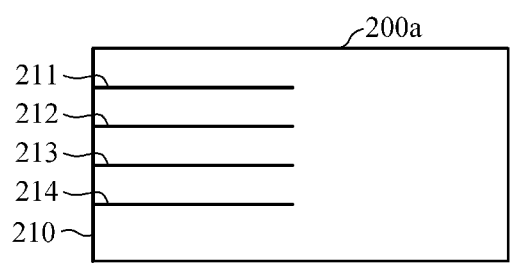
FIGS. 2A and 2B are diagrams explaining a structure of sensor cartridges according to an embodiment of the present disclosure.
Figure 2B:
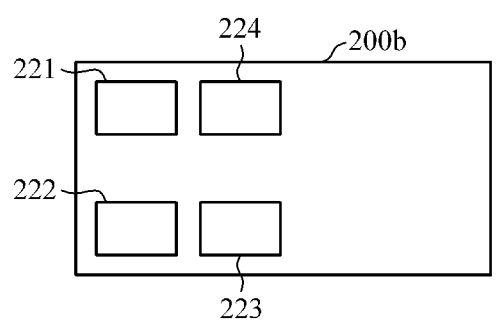

FIGS. 2A and 2B are plan views for explaining a structure of sensor cartridges 200a and 200b according to an embodiment of the present disclosure.

Upon reaction with a biomarker, each of measurement channels 211, 212, 213, and 214 of FIG. 2A may change in color, in a direction away from one surface 210 of the sensor cartridge 200a to which the biomarker is introduced. In this case, the processor 140 may obtain color change information in a longitudinal direction from the sensor cartridge 200a.

In FIG. 2A, the sensor cartridge 200a includes four measurement channels 211, 212, 213, and 214, but a number of the measurement channels is not limited thereto, and may be changed to various numbers. In FIG. 2A, the respective measurement channels 211, 212, 213, and 214 are disposed at equal intervals, but the arrangement is not limited thereto, and the respective measurement channels 211, 212, 213, and 214 may be disposed at different intervals.

The respective measurement channels 211, 212, 213, and 214 may have various shapes such as a cylindrical shape, a polyprism shape, and the like. However, the shape is not limited thereto. Each of the measurement channels 211, 212, 213, and 214 may have a cross-sectional area which decreases or increases further away from the one surface 210 of the sensor cartridge 200a. For example, each of the measurement channels 211, 212, 213, and 214 may be formed as a convex lens or a concave lens, or may be formed in a trapezoidal shape, and the like. In this case, the one surface 210 of the sensor cartridge 200a may refer to a surface, to which the biomarker is introduced.

There may be a plurality of measurement channels, each of which may react to different types of biomarkers. In this case, as the respective measurement channels have different probes, several biomarkers may be measured at the same time. For example, the measurement channel 211 may have a probe reacting only with acetone, the measurement channel 211 may have a probe reacting only with ammonia, the measurement channel 213 may have a probe reacting only with carbon dioxide, and the measurement channel 214 may have a probe reacting only with hydrogen. However, the measurement channels are not limited thereto, and some of the respective measurement channels 211, 212, 213, and 214 may react with the same biomarker, and the others may react with different biomarkers. This is because different types of probes may react only with biomarkers corresponding to the respective probes.

The probes included in the respective measurement channels 211, 212, 213, and 214 may have unique colors, and thus may be distinguished by their colors. For example, the probe of the measurement channel 211 may have a yellow color, the probe of the measurement channel 212 may have an orange color, the probe of the measurement channel 213 may have a green color, and the probe of the measurement channel 214 may have a blue color, and each color may become darker when reacting with a biomarker. However, the probes of the respective measurement channels 211, 212, 213, and 214 are not limited thereto, and may be changed to colors, completely different from their unique colors, when reacting with a biomarker.

FIG. 2B is a plan view explaining a structure of the sensor cartridge 200b according to another embodiment of the present disclosure. FIG. 2B illustrates an upper surface of the sensor cartridge 200b. When reacting with a biomarker, the respective measurement channels 221, 222, and 223 of FIG. 2B may change in color in a direction from a lower surface of the sensor cartridge 220a, to which a biomarker is introduced, toward the upper surface thereof. In this case, the processor 140 may obtain color change information in a depth direction from the sensor cartridge 200a.

Referring to FIG. 2B, the sensor cartridge 200b may include three measurement channels 221, 222, and 223, and one reference channel 224. However, a number of the measurement channels and a number of the reference channel are not limited thereto, and may be changed to various numbers. Further, while FIG. 2B illustrates four channels 221, 222, 223, and 224 which are arranged in a rectangular shape, but the shape is not limited thereto, and may be a straight line shape, a circular shape, and the like.

Compared to the respective measurement channels 211, 212, 213, and 214 of FIG. 2A, the respective measurement channels 221, 222, and 223 of the sensor cartridge 200b of FIG. 2B may have a larger cross-sectional area for reacting with a biomarker. In this case, the respective measurement channels 221, 222, and 223, having a larger cross-sectional area, may have a higher reaction sensitivity than the respective measurement channels 211, 212, 213, and 214 of FIG. 2A.

In the case of FIG. 2B, as illustrated in FIG. 2A, the respective measurement channels 221, 222, and 223 may have a cross-sectional area which decreases or increases from the lower surface of the sensor cartridge 200b toward the upper surface thereof. For example, each of the measurement channels 221, 222, and 223 may be formed as a convex lens or a concave lens, or may be formed in a trapezoidal shape, and the like.

The reference channel 224 of the sensor cartridge 200b of FIG. 2B may include a material which does not change when reacting with a biomarker. For example, when the measurement channels 221, 222, and 223 change in color upon reaction with each biomarker corresponding thereto, the reference channel 224 may not change in color. In this case, the processor 140 may compare a quantity of light, detected from each channel, with a quantity of light detected from the reference channel 224.

As illustrated in FIG. 2A, the probes included in the respective measurement channels 221, 222, and 223 may have unique colors, and thus may be distinguished by their colors. When reacting with a biomarker, the color of each probe may become darker or may be changed to a completely different color.

Figure 2C:
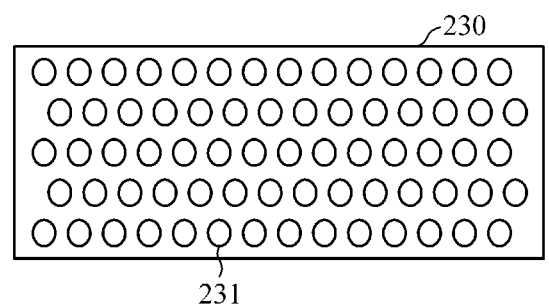
FIG. 2C is a diagram illustrating a measurement channel according to an embodiment of the present disclosure.

FIG. 2C is a cross-sectional view of a measurement channel 230 according to an embodiment of the present disclosure. The measurement channel 230 may be formed as a porous substrate. The porous substrate may be formed of at least one of silica, alumina, polymer, and molecular sieve. In this case, a size of each pore 231 of the porous substrate is not limited to a specific value, and may be readily changed to various values. For example, in order to control a speed at which a biomarker is introduced and diffused in the measurement channel, the size of the pore 231 of the porous substrate may be adjusted to various sizes by reducing or increasing the size. As described above, by adjusting the size of the pore 231, a total measurement possible time may be adjusted, thereby adjusting a cartridge replacement period.

Referring to FIG. 2C, each probe may be disposed on the porous substrate. For example, the probe may be disposed on each pore 231 of the porous substrate. As different probes react with different biomarkers, such that by having different probes, a plurality of measurement channels may measure several biomarkers at the same time, as described above with reference to FIG. 2A. The respective probes may have unique colors as described above with reference to FIG. 2A, and the colors may be yellow, orange, green, blue, etc., with no particular limitation.

Referring back to FIG. 1A, the light source 120 may emit light onto the measurement channels of the sensor cartridge 110. The light source 120 may include a light emitting diode (LED), a laser diode (LD), a phosphor, and the like, but is not limited thereto. The light source 120 may include a plurality of light sources, in which case the plurality of light sources may emit light of the same wavelength or light of different wavelengths. For example, the light source 120 may emit light of a green wavelength, a blue wavelength, a red wavelength, an infrared wavelength, etc., but is not limited thereto.

The detector 130 may detect light transmitted through the measurement channels after the light is emitted by the light source 120 onto the measurement channels, or light scattered or reflected from the measurement channels. The detector 130 may include a photodiode, a photo transistor, and the like. However, the detector 130 is not limited thereto, and may include a complementary metal-oxide semiconductor (CMOS) image sensor, a charge-coupled device (CCD) image sensor, and the like. The detector 130 may include a plurality of detectors.

For example, when the color of a probe changes as a biomarker of an object, introduced through an inlet formed at a position in contact with the object, reacts with the measurement channel of the sensor cartridge 110, the light source 120 may emit light onto the measurement channel, and the detector 130 may detect light transmitted into or scattered or reflected from the sensor cartridge 110.

The processor 140 may be electrically or mechanically connected to the light source 120 and the detector 130 or may communicate therewith via wired or wireless communications. The processor 140 may control the light source 120 and the detector 130. For example, upon receiving a request for estimating a biomarker concentration by a user's operation, or when the sensor cartridge 110 is inserted into an insertion part (e.g., a slot) of the apparatus 100a for estimating a concentration of a biomarker, or when an object is placed on the inlet disposed on one surface of the apparatus for estimating a concentration of a biomarker, the processor 130 may control the intensity and duration of light of the light source 120, and on/off of the light source 120.

The processor 140 may process a light signal received from the detector 130. In this case, upon receiving the light signal from the detector 130, the processor 140 may perform preprocessing, such as filtering the light signal for reducing noise, amplifying the light signal, or converting the signal into a digital signal, and the like. For example, the processor 10 may remove noise from the light signal, received from the detector 130, by band-pass filtering and the like. However, the preprocessing is not limited thereto, and the processor 140 may perform various preprocessing operations according to various measurement environments such as computing performance or measurement accuracy of a device, purpose of estimating bio-information, a portion of a user's object, temperature and humidity of an object, and the like.

Based on the light signal detected by the detector 130, the processor 140 may estimate a concentration of a biomarker. In this case, the biomarker may include at least one of acetone, ammonia, carbon dioxide, and hydrogen, but is not limited thereto.

The processor 140 may estimate a concentration of a biomarker continuously for a predetermined period of time (e.g., 8 hours, 12 hours, or 48 hours). For example, the processor 140 may continuously estimate a biomarker concentration by continuously obtaining a variation in absorbance or a color change speed at the measurement channel of the sensor cartridge for a maximum time of use of the sensor cartridge, or for a period of time required by a user to estimate the biomarker concentration.

Based on the light detected by the detector 130, the processor 140 may obtain color change information of the measurement channel and may estimate the biomarker concentration based on the obtained color change information. In this case, the color change information may include at least one of, for example, color change information in a longitudinal direction including a color change speed, and color change information in a depth direction including a variation in absorbance.

Figure 3A:
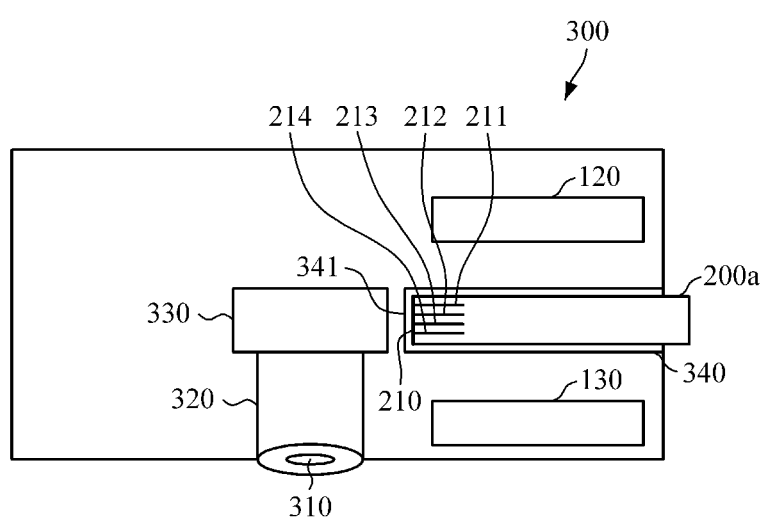
FIG. 3A is a diagram illustrating a structure of an insertion part which is formed so that a sensor cartridge is disposed side by side with a side surface of a chamber.

FIG. 3A illustrates an example of a structure of an apparatus for estimating a concentration of a biomarker to obtain color change information in a longitudinal direction.

Referring to FIG. 3A, the apparatus 300 for estimating a concentration of a biomarker according to an embodiment includes the light source 120, the detector 130, an inlet 310, a movement channel 320, a chamber 330, an insertion part (e.g., a slot) 340, and the sensor cartridge 200a.

The light source 120 may emit light while the measurement channels 211, 212, 213, and 214 of the sensor cartridge 200a react with biomarkers; and the detector 130 may detect light transmitted through the measurement channels 211, 212, 213, and 214 after the light is emitted from the light source 120 onto the measurement channels 211, 212, 213, and 214. While FIG. 3A illustrates an example in which the light source 120 is disposed above the sensor cartridge 200a, the arrangement is not limited thereto, and the light source 120 may be disposed at various positions according to a form factor and the like. At least a portion of the insertion part 340, into which the sensor cartridge 200a is inserted, may be formed as a light transmissive region, so that the light emitted by the light source 120 may be transmitted therethrough.

Figure 4A:
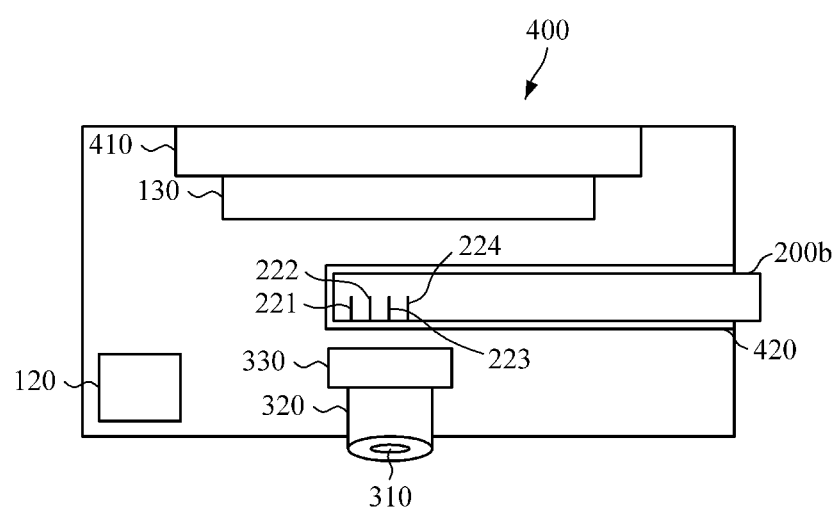
FIG. 4A is a diagram explaining a structure of a sensor cartridge which is formed so that a sensor cartridge is disposed above a chamber.

Referring to FIG. 4A, the driving part 410 may include a manipulator capable of turning on/off the power of the apparatus 400 for estimating a concentration of a biomarker according to a user's operation including a touch, and a battery supplying power to the apparatus 400 for estimating a concentration of a biomarker.

The inlet 310 may be formed at a position coming into contact with the object, and when the object comes into contact with the inlet 310, a biomarker of the object may be introduced therethrough. In this case, the object may be an area on the wrist that is adjacent to the radial artery, and an upper portion of the wrist where veins or capillaries are located, or a peripheral part of the body, such as fingers, toes, etc., where blood vessels are densely distributed.

The inlet 310 may have a permeable membrane for selectively transmitting a biomarker to be measured. Further, the inlet 310 may include a separate filter for blocking the entry of foreign matter and preventing humidity interference in measurement of a biomarker concentration. The inlet 310 may further include a contact sensor for determining contact with the object.

The chamber 330 may be connected to the inlet 310 via the movement channel 320, and the biomarker of the object, introduced through the inlet 310, may be stored in the chamber 330 via the movement channel 320. There is no limitation on the shape and/or material of the chamber 330, and one side of the chamber 330 may come into contact with the sensor cartridge 200a, to allow the biomarker to move to the sensor cartridge 200a.

The insertion part 340 is formed such that the sensor cartridge 200a may be detachable therefrom, and as illustrated herein, the insertion part 340 and the chamber 330 may be disposed side by side and at the same height. In this case, when the sensor cartridge 200a is inserted, the insertion part 340 may guide the sensor cartridge 200a to the side surface of the chamber 330. In this case, the biomarker stored in the chamber 330 may be introduced into the measurement channels 211, 212, 213, and 213 of the sensor cartridge 200a along the one surface 341 of the insertion part 340.

In this case, discoloration occurs in a direction away from the one surface 210 of the sensor cartridge 200a, to which the biomarker is introduced. In this case, the processor 140 may obtain color change information in a longitudinal direction, including a color change speed, from the sensor cartridge 200a.

Figure 3B:
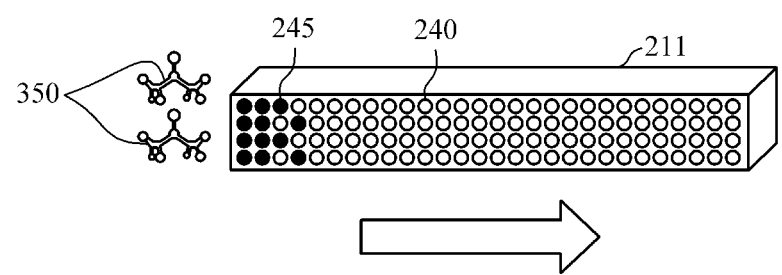
FIGS. 3B to 3D are diagrams explaining a process of estimating a concentration of a biomarker in the case where a sensor cartridge is disposed side by side with a side surface of a chamber.

FIG. 3B is a diagram illustrating an example in which the biomarker 350 stored in the chamber 330 is introduced into the measurement channel 211 of the sensor cartridge 200a. For convenience of explanation, only the measurement channel 211 is illustrated herein, and the measurement channels 212, 213, and 214 are omitted. As described above, probes of the respective measurement channels 211, 212, 213, and 214 may react with different biomarkers.

After being introduced into the measurement channel 211, the biomarker 350 may move in a direction, indicated by an arrow, to change the color of the probe 240. As the biomarker 350 moves in the direction indicated by the arrow, the probe 240 may also change in color upon reaction with the biomarker 350, and as a result of the color change, a probe 245 is shown in a different color.

In this case, the processor 140 may obtain a speed of the color change in the direction indicated by the arrow as the color change information in the longitudinal direction, and may estimate a concentration of a biomarker based on the obtained color change information.

Figure 3C:
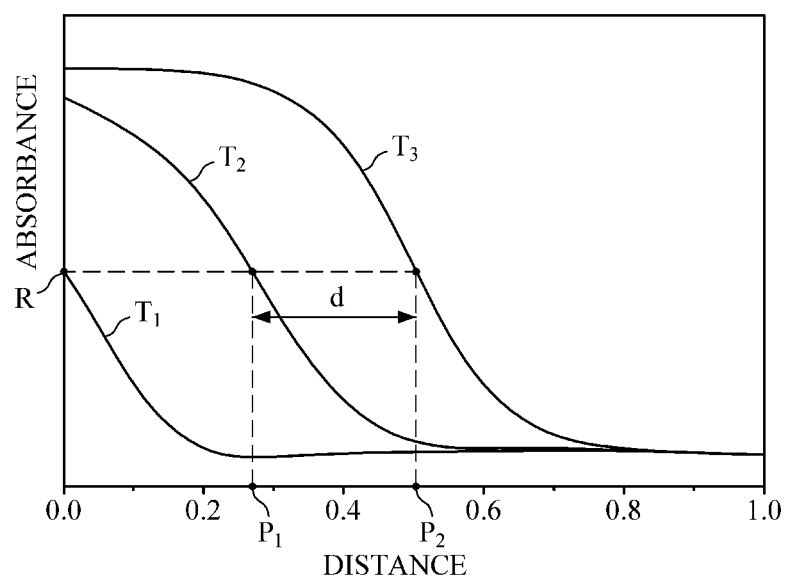

FIG. 3C is a graph of absorbance with respect to distance of color change measured from measurement channels of a sensor cartridge for a predetermined period of time.

Referring to FIG. 3C, the horizontal axis indicates a distance from a reaction start point 0 of the measurement channel 211 of the sensor cartridge 200a, and a vertical axis indicates absorbance measured by the detector 130. The processor 140 may obtain a color change speed by using the graph of absorbance at least at two or more time points T1, T2, and T3 of the graph of color change over a predetermined period of time. For example, the processor 140 may set a reference absorbance R, and may determine points 0, P1, and P2, at which the reference absorbance R is detected, in each absorbance graph. In this case, the reference absorbance R may be, for example, absorbance at the reaction start point corresponding to an initial measurement time point, but is not limited thereto. The processor 140 may obtain the color change speed of the measurement channel 211 based on at least two points, at which the reference absorbance R is detected.

For example, the processor 140 may select two points P1 and P2 from among the points 0, P1, and P2 at which the reference absorbance R is detected, and may calculate a distance d between the selected two points P1 and P2. In this case, by dividing the calculated distance d by a time interval T3−T2 between the detected two points P1 and P2, the processor 140 may obtain the color change speed.

The processor 140 may estimate a concentration of a biomarker by using the obtained color change speed. For example, by using an estimation model which defines a correlation between the color change speed and the biomarker concentration, the processor 140 may obtain an estimated biomarker concentration value corresponding to the obtained color change speed. In this case, the estimation model may be defined for each measurement channel and/or biomarker.

Figure 3D:
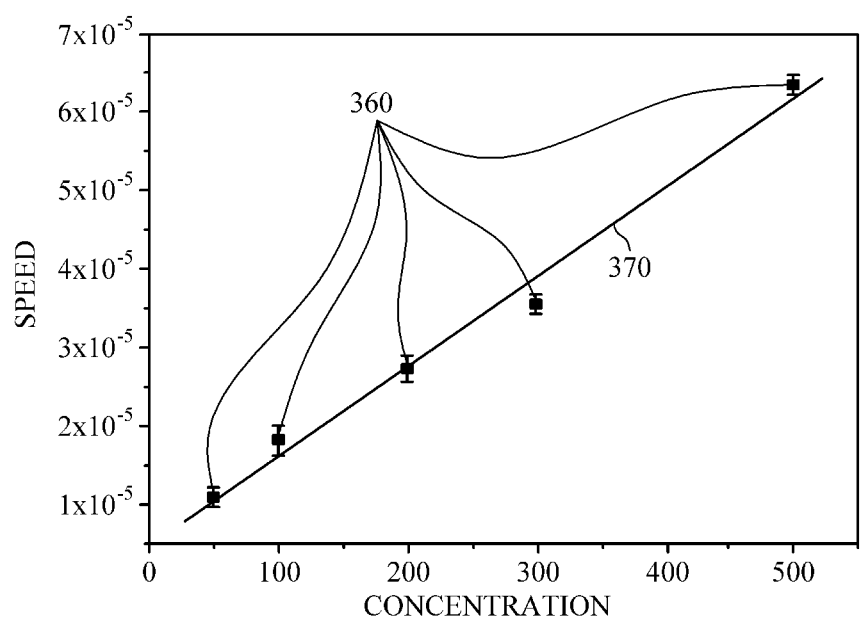

For example, FIG. 3D illustrates an estimation model 370 which defines a correlation between a color change speed and a biomarker concentration. In this case, the estimation model 370 may be predefined to be used universally for a plurality of users, or an estimation model, personalized to a specific user by the processor 140, may be predefined by calibration. As an example of the calibration, the horizontal axis of FIG. 3D indicates a concentration of a biomarker, and the vertical axis indicates a color change speed of the measurement channel 211. By plotting each color change speed 360, obtained from a user during calibration, against the biomarker concentration measured by an external device, the processor 140 may generate the estimation model 370. In FIG. 3D, the estimation model 370 is expressed in the form of a linear function, but is not limited thereto and may be modified variously.

FIG. 4A is a diagram illustrating an example of a structure of an apparatus for estimating a concentration of a biomarker to obtain color change information in a depth direction.

Referring to FIG. 4A, the apparatus 400 for estimating a concentration of a biomarker according to another embodiment of the present disclosure includes the light source 120, the detector 130, a driving part (e.g., a driver) 410, the inlet 310, the movement channel 320, the chamber 330, an insertion part (e.g., a slot) 420, and the sensor cartridge 200b. The light source 120, the detector 130, the inlet 310, the movement channel 320, and the chamber 330 are described in detail above with reference to FIGS. 1A and 3A, such that a description thereof will be omitted.

Referring to FIG. 4A, the insertion part 420 may be disposed on an upper surface of the chamber 330. In this case, when the sensor cartridge 200b is inserted, the insertion part 420 may guide the sensor cartridge 200b to the upper surface of the chamber 330. A biomarker stored in the chamber 330 may be introduced into the respective measurement channels 221, 222, and 223 of the sensor cartridge 200b along one surface of the insertion part 420.

In this case, discoloration occurs in a direction from a lower surface of the sensor cartridge 200b, to which the biomarker is introduced, toward an upper surface thereof. In this case, the processor 140 may obtain color change information in the depth direction from the sensor cartridge 200b.

Figure 4B:
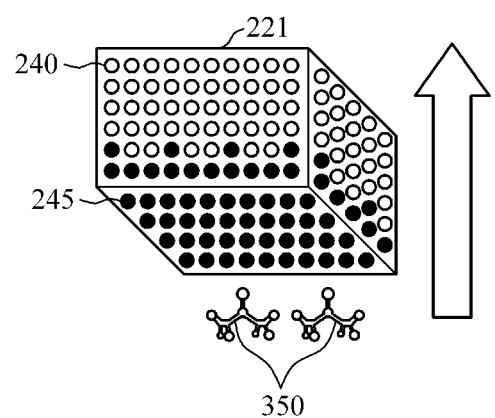
FIGS. 4B to 4D are diagrams explaining a process of estimating a concentration of a biomarker in the case where a sensor cartridge is disposed above a chamber.
Figure 4C:
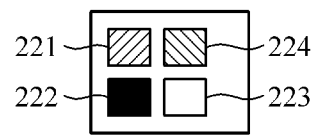

FIG. 4B is a diagram illustrating an example in which the biomarker 350 stored in the chamber 330 is introduced into the measurement channel 221 of the sensor cartridge 200b. For convenience of explanation, only the measurement channel 221 is illustrated herein, and the measurement channels 222, 223, and 224 are omitted. As described above, probes of the respective measurement channels 221, 222, 223 and 224 may react with different biomarkers.

After being introduced into the measurement channel 221, the biomarker 350 may move in a direction indicated by an arrow, to change the color of the probe 240. As the biomarker 350 moves in the direction indicated by the arrow, the probe 240 may also change in color upon reaction with the biomarker 350, and as a result of the color change, a probe 245 is shown in a different color.

As described above with reference to FIG. 2B, the respective measurement channels 221, 222, and 223 of the sensor cartridge 200b of FIGS. 2B and 4A may have a larger cross-sectional area for reacting with a biomarker than the respective measurement channels 211, 212, 213, and 214 of the sensor cartridge 200a of FIGS. 2A and 3A. In this case, the respective measurement channels 221, 222, and 223 of FIGS. 2B and 4A, having a larger cross-sectional area, may have a higher reaction sensitivity than the respective measurement channels 211, 212, and 213 of FIGS. 2A and 3A.

When discoloration occurs in the direction indicated by the arrow, the processor 140 may compare a quantity of light detected from the measurement channel 221 with a quantity of light detected from the reference channel 224, based on a light detection result of the detector 130. In this case, the reference channel 224 may include a material does not change in color upon reaction with a biomarker.

Upon comparison, the processor 140 may obtain absorbance of the measurement channel 221 at a specific time point or an absorbance variation over a predetermined period of time. For example, when a specific period of time elapses after a time point at which the measurement channel 221 starts to change in color, the processor 140 may obtain absorbance at the specific time point by comparing a quantity of light detected from the measurement channel 221 with a quality of light detected from the reference channel 224. In another example, when the measurement channel 140 changes in color, the processor 140 may select any two time points, and may obtain an absorbance variation over a predetermined period of time by comparing the quantity of light detected from the measurement channel 221 with the quantity of light detected from the reference channel 224 at the selected two time points. For convenience of explanation, the following description will be made based on the absorbance variation.

The processor 140 may obtain a variation A in absorbance of the respective measurement channels 221, 222, and 223 by using a predetermined equation for calculating absorbance measurement, such as the following Equation 1. The equation for calculating absorbance measurement may be expressed in the form of various linear or non-linear combination functions, such as addition, subtraction, division, multiplication, logarithmic value, regression equation, and the like, with no particular limitation.

$$A = -\log_{10}\left(\frac{I_{sensor}}{I_{ref}}\right) \quad \text{[Equation 1]}$$

In Equation 1, A denotes the variation in absorbance of the measurement channels 221, 222, and 223, $I_{sensor}$ denotes the quantity of light detected from the measurement channels 221, 222, and 223, and $I_{ref}$ denotes the quantity of light detected from the reference channel 224.

The processor 140 may obtain the obtained variation in absorbance as the color change information in the depth direction of the measurement channel 221.

The processor 140 may estimate a biomarker concentration by using the obtained variation in absorbance. For example, by using an estimation model which defines a correlation between the variation in absorbance and a biomarker concentration, the processor 140 may obtain an estimated biomarker concentration value corresponding to the obtained variation in absorbance. In this case, the estimation model may be defined for each measurement channel and/or the biomarker.

Figure 4D:
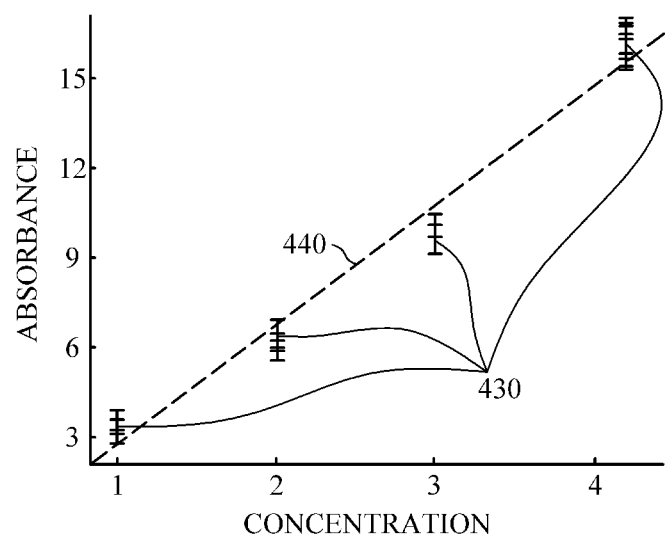

For example, FIG. 4D illustrates an estimation model 440 which defines a correlation between the variation in absorbance and the biomarker concentration. In this case, the estimation model 430 may be predefined to be used universally for a plurality of users, or an estimation model, personalized to a specific user by the processor 140, may be predefined by calibration. As an example of the calibration, the horizontal axis of FIG. 4D indicates a concentration of a biomarker, and the vertical axis indicates a variation in absorbance of the measurement channel 211. The processor 140 may generate the estimation model 370 by plotting the absorbance variation 430, obtained from a user during calibration, against the biomarker concentration measured by an external device. In FIG. 4D, the estimation model 440 is expressed in the form of a linear function, but is not limited thereto and may be modified variously.

Referring back to FIG. 1A, the processor 140 may estimate a user's physiological status based on the estimated biomarker concentration. In this case, the physiological status may include at least one of nutrient intake status, metabolic status, exercise status, calorie intake, and calorie consumption.

The processor 140 may estimate the physiological status by using a physiological status estimation model such as the following Equation 2. The physiological status estimation model may be expressed in the form of various linear or non-linear combination functions, such as addition, subtraction, division, multiplication, logarithmic value, regression equation, and the like, with no particular limitation. For example, the following Equation 2 is an example of a simple linear function.

$$y = ax + b \quad \text{[Equation 2]}$$

In Equation 2, y denotes the physiological status to be estimated, for example, nutrient intake status, metabolic status, and the like; x denotes a biomarker concentration value estimated in relation to the physiological status to be estimated; and a and b denote coefficients for weighting the estimated biomarker concentration, and may be fixed values universally applicable to a plurality of users predefined according to the physiological status to be estimated, or may be values adjusted for each user based on user characteristics and the like. In this case, the value x may be any one or a combination of two or more of biomarker concentration values estimated over a predetermined period of time or more. Criteria for combining the estimated biomarker concentration values may be defined differently according to a type of physiological status, in which case the criteria may be defined properly for each user based on user characteristics.

Figure 1B:
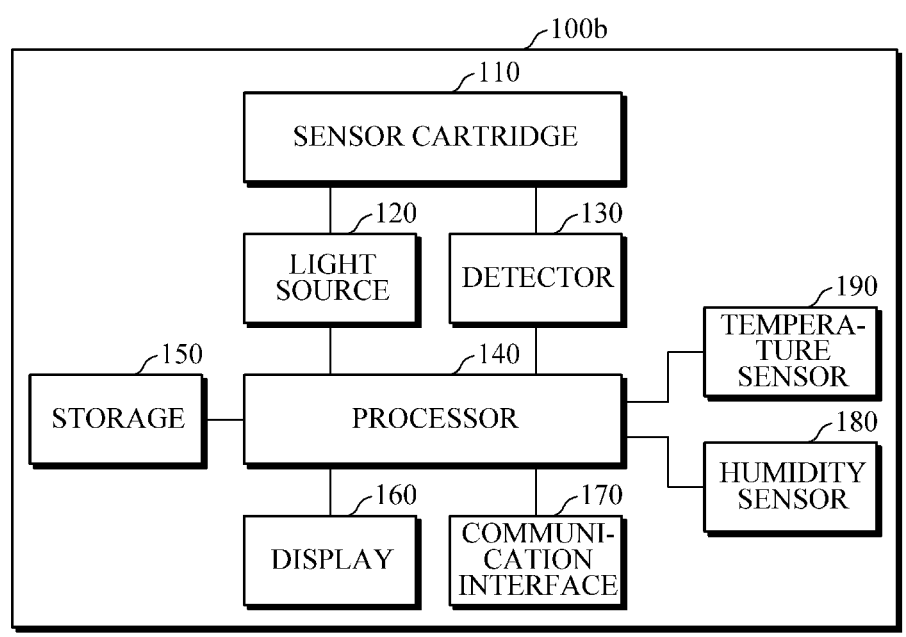
FIG. 1B is a block diagram illustrating an apparatus for estimating a concentration of a biomarker according to another embodiment of the present disclosure.

FIG. 1B is a block diagram illustrating an apparatus for estimating a concentration of a biomarker according to another embodiment of the present disclosure. The sensor cartridge 110, the light source 120, the detector 130, and the processor 140 are described in detail above with reference to FIG. 1A, such that the following description will be focused on non-overlapping parts.

The storage 150 may store reference information for estimating a biomarker concentration, and processing results of the detector 130 and/or the processor 140. In this case, the reference information may include user information, such as a user's age, gender, health condition, etc. a normal contact state such as a contact position including the wrist, light source driving conditions, or a biomarker concentration estimation model, and the like, but is not limited thereto.

In this case, the storage 150 may include at least one storage medium of a flash memory type memory, a hard disk type memory, a multimedia card micro type memory, a card type memory (e.g., an SD memory, an XD memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like, but is not limited thereto.

A display 160 may display a graphic object, indicating a contact state including a contact position of the object, on a display. Further, once an estimated biomarker concentration value and/or an estimated physiological status value are obtained, the display 160 may visually display the estimated biomarker concentration value and/or the estimated physiological status value on the display mounted in the apparatus 100b for estimating a concentration of a biomarker or on a display of a connected external device. In this case, if the estimated biomarker concentration value and/or the estimated physiological status value fall outside a normal range, the display 160 may visually output alarm/warning information. Alternatively, the display 160 may output warning information associated with the contact state, the biomarker concentration, and the estimated physiological status value, by using a non-visual output module, such as a sound output module or a haptic module.

A communication interface 170 may communicate with an external device under the control of the processor 140, to transmit and receive various data related to estimation of the biomarker concentration. For example, the communication interface 170 may transmit a processing result of the processor 140 and the like to the external device, to allow the external device to manage a physiological status history for a user, to monitor a user's health condition, to output the physiological status history and the health condition monitoring result, and the like. In this case, the external device may include a smartphone, a tablet PC, a desktop computer, a laptop computer, and the like, and a medical institution device including a biomarker concentration reference meter SIFT-MS.

In another example, the communication interface 170 may receive a biomarker concentration estimation model, user characteristic information, and the like, which are required for estimating a biomarker concentration, from an external device. The received information may be stored in the storage 150.

In this case, the communication interface 170 may communicate with the external device by using Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, WIFI communication, Radio Frequency Identification (RFID) communication, 3G communication, 4G communication, 5G communication, and the like. However, this is merely exemplary and is not intended to be limiting.

A humidity sensor 180 may measure ambient humidity around the sensor cartridge 110, and a temperature sensor 190 may measure temperature of the sensor cartridge 110 or ambient temperature around the sensor cartridge 110.

The apparatus 100b for estimating a concentration of a biomarker may further include a pressure sensor. The pressure sensor may measure pressure applied to the sensor cartridge 110 or ambient pressure around the sensor cartridge 110. The pressure sensor may include an atmospheric pressure sensor, an acceleration sensor, a strain gauge, a piezoelectric film, a load cell, radar, and the like, but is not limited thereto.

For example, based on at least one of the following values, including a humidity value measured by the humidity sensor 180, a temperature value measured by the temperature sensor 190, and a pressure value measured by the pressure sensor, the processor 140 may correct the biomarker concentration estimated by the respective measurement channels 211, 212, 213, and 214 of the sensor cartridge 110. In this case, the processor 140 may use a concentration correction equation which defines a correlation between at least one of the humidity, temperature, and pressure values and a concentration of a target biomarker. The concentration correction equation may be obtained experimentally and may be stored in a database inside or outside of the processor 140. In another example, the processor 140 may estimate the biomarker concentration based on a biomarker concentration estimation model using at least one of the measured humidity, temperature, and pressure values as an input value.

Figure 5A:
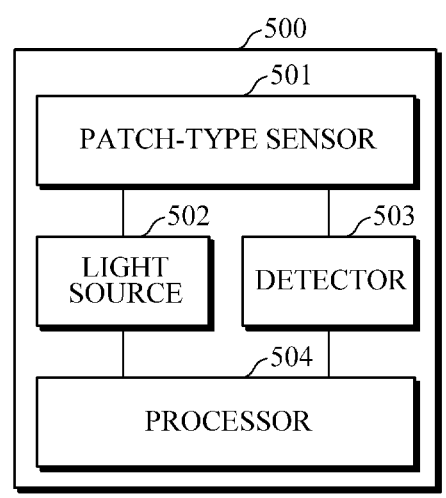
FIGS. 5A to 5D are diagrams explaining a structure of a patch-type sensor according to an embodiment of the present disclosure.

FIG. 5A is a block diagram illustrating an apparatus for estimating a concentration of a biomarker according to another embodiment of the present disclosure. The apparatus 500 for estimating a concentration of a biomarker according to an embodiment includes a patch-type sensor 501, a light source 502, a detector 503, and a processor 504.

In this case, the patch-type sensor 501 may be detached from the apparatus 500 for estimating a concentration of a biomarker. For example, the patch-type sensor 501 may be detached from the apparatus 500 for estimating a concentration of a biomarker, to be attached to a user's object, and after a lapse of a predetermined period of time, the patch-type sensor 501 may be removed from the user's object to be coupled again to the apparatus 500 for estimating a concentration of a biomarker. Once the patch-type sensor 501 is removed from the object and is coupled again to the apparatus 500 for estimating a concentration of a biomarker, the light source 502 may emit light onto the patch-type sensor 501, and the detector 503 may detect light transmitted into, or scattered or reflected from, the patch-type sensor 501.

Figure 5B:
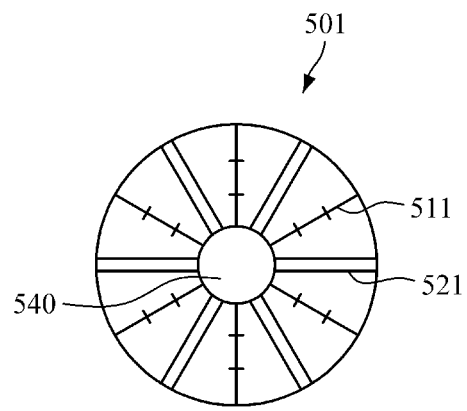
Figure 5C:
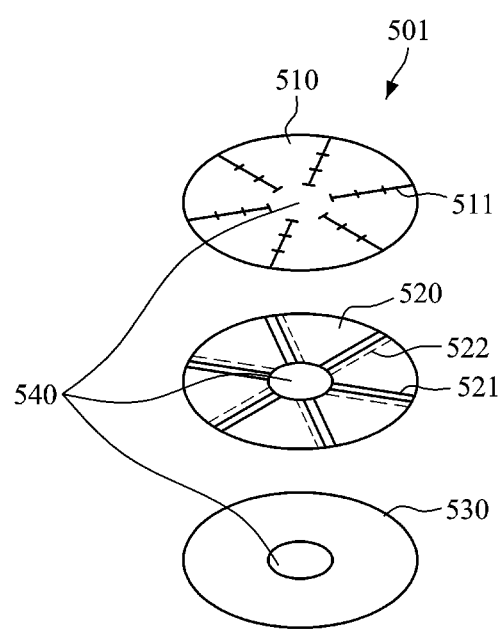
Figure 5D:
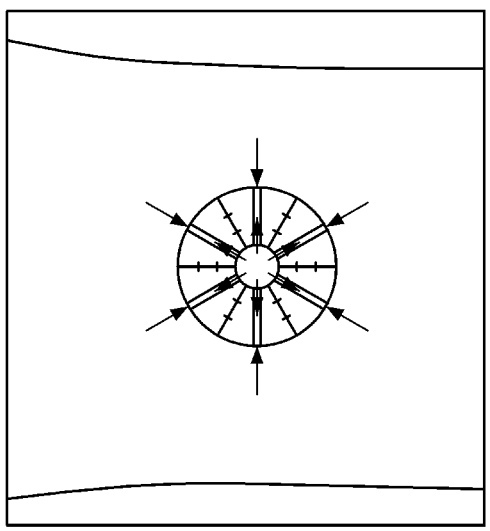

FIGS. 5B to 5D are diagrams explaining a structure of the patch-type sensor 501 according to an embodiment of the present disclosure. FIG. 5B is a plan view of the patch-type sensor 501, and FIG. 5C is an exploded perspective view of the patch-type sensor 501.

Referring to FIG. 5C, the patch-type sensor 501 includes a transparent cover surface 510, a sensor cartridge 520, and a contact surface 530.

The transparent cover surface 510 may have marker lines 511 so that at least one of a position of each measurement channel 521 and color change information may be visually identified. For example, as illustrated in FIG. 5B, the transparent cover surface 510 and the sensor cartridge 520 may be coupled to each other so that a measurement channel 521 may be disposed between the respective marker lines 511. In another example, when a probe of the measurement channel 521 changes in color upon reaction with a biomarker, a user may visually identify a length of the color-changed portion of the measurement channel 521 by comparison with the marker line 511. At least a portion of the transparent cover surface 510 may be formed as a light transmissive region, so that light emitted by the light source 502 may be directed toward the sensor cartridge 520. For example, other regions of the transparent cover surface 510, except the marker line 511, may be the light transmissive regions.

The contact surface 530 may be disposed below the sensor cartridge 520, and may come into contact with the object. The contact surface 530 may further include an adhesive material to maintain contact between the patch-type sensor 501 and the object.

The patch-type sensor 501 may further include a transparent tape surrounding the patch-type sensor 501 to block the entry of foreign matter and maintain the patch-type sensor 501 in a sealed state.

The sensor cartridge 520 may be disposed above the contact surface 530, and may include at least one or more measurement channels 521 formed as a porous substrate. While FIGS. 5B and 5C illustrate six measurement channels 521 disposed at regular intervals, a number, position, shape, and the like of the measurement channels are not limited thereto. The measurement channels 521 may include probes, which are disposed on each pore of the porous substrate and change in color upon reaction with a biomarker. The probes, the measurement channels, and the sensor cartridge are described in detail above with reference to FIGS. 2A to 2C, such that a redundant description thereof will be omitted.

Referring to FIG. 5D, a biomarker of an object may be introduced into the measurement channels of the sensor cartridge in a direction indicated by an arrow, i.e., through at least one of a hole and an outer edge of the sensor cartridge. When a biomarker, introduced into the patch-type sensor 501, changes the color of the probes of the measurement channels 521 of the sensor cartridge 520, the processor 504 may obtain color change information of the measurement channels 521 based on light detected by the detector 503. In this case, the color change information may include color change information in a longitudinal direction.

The processor 504 may obtain the color change information in the longitudinal direction, including a color change speed of the measurement channel 521, and may estimate a concentration of the biomarker based on the obtained color change information in the longitudinal direction.

For example, the transparent cover surface 510, the sensor cartridge 520, and the contact surface 530 of the patch-type sensor 501 may include a common hole 540, through which the biomarker may be introduced. In this case, the hole 540 may be omitted from the transparent cover surface 510. When the biomarker, introduced through the hole 540, changes the color of the probes of the measurement channels 521 of the sensor cartridge 520, the processor 504 may obtain the color change information in the longitudinal direction, and may estimate a concentration of the biomarker based on the obtained color change information. In this case, the color change information in the longitudinal direction may refer to a speed at which the color of the measurement channels 521 is changed.

The processor 504 may obtain the color change speed of the measurement channel 521 based on absorbance, or a variation in absorbance, of the measurement channel 521 which is measured by the detector 503. In this case, when obtaining the absorbance or the variation in absorbance, the processor 504 may compare the quantity of light detected at a predetermined reference point 522 of the sensor cartridge 520, and the quantity of light detected from the measurement channel 521. The processor 504 may use the equation for calculating absorbance measurement such as the above Equation 1, and a detailed description thereof will be omitted. As illustrated in FIG. 3C, the processor 504 may set a reference absorbance, and may calculate a first distance between a first point and a second point of the measurement channel 521, at which the reference absorbance is detected. Based on the calculated first distance, the processor 504 may obtain a color change speed of the measurement channel 521.

In another example, the biomarker may be introduced through the outer edge of the sensor cartridge 520. In this case, the processor 504 may calculate a second distance between a third point and a fourth point, at which the reference absorbance is detected upon reaction with the biomarker introduced through the outer edge of the sensor cartridge 520, and may obtain the color change speed of the measurement channel 521 based on the calculated second distance.

The processor 504 may calculate a statistical value of the first distance and the second distance, and may obtain the color change speed based on the calculated statistical value. For example, the processor 504 may calculate a mean value of the calculated first and second distances, and may divide the calculated mean value by a measurement time to obtain the resultant value as the color change speed.

The processor 504 may calculate a statistical value of a first change speed, obtained based on the first distance, and a second change speed obtained based on the second distance, and may obtain the calculated statistical value as the color change speed of the measurement channel 521. For example, the processor 504 may obtain a mean value of the first change speed and the second change speed, a value obtained by normalizing the first change speed based on the second change speed, and the like as the color changes speed.

The processor 504 may estimate a concentration of the biomarker by using a correlation which defines a correlation between the color change speed and a biomarker concentration.

Figure 6A:
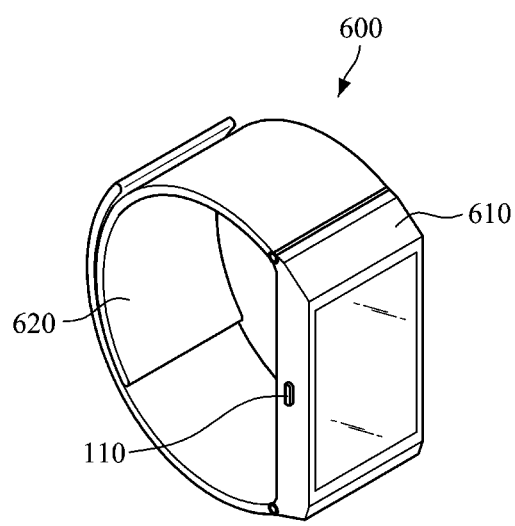
FIGS. 6A, 6B, and 7 are diagrams illustrating an electronic device according to an embodiment of the present disclosure.
Figure 6B:
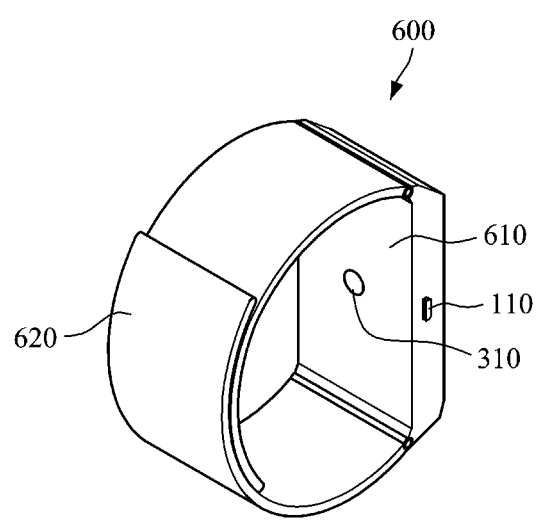
Figure 7:
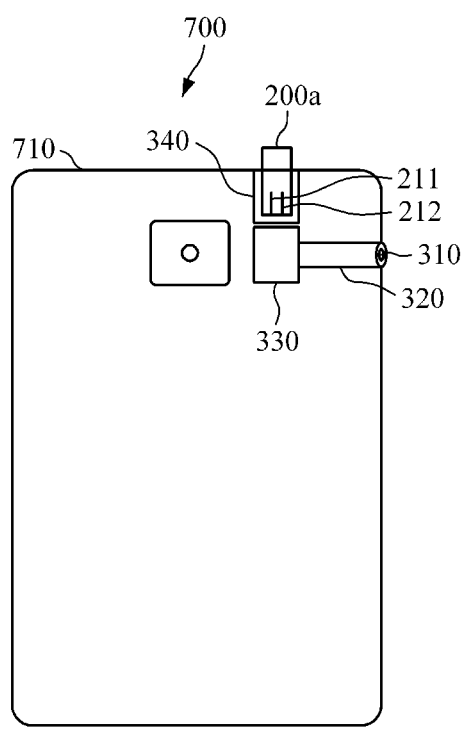

FIGS. 6A to 7 are diagrams illustrating an electronic device including the aforementioned apparatus for estimating a concentration of a biomarker. The electronic device according to embodiments of the present disclosure may be a smart watch, a smart band-type wearable device, or a mobile device such as a smartphone or a tablet PC, but is not limited thereto.

Referring to FIGS. 6A and 6B, a smart band-type wearable device is illustrated as an example of the electronic device 600, and may include a main body 610, the sensor cartridge 110, the inlet 310, and a strap 620. In this case, the sensor cartridge 110 may be inserted through an insertion part formed at a side surface of the main body 610. The inlet 310 is formed on a lower surface of the main body, such that a biomarker generated from a user's wrist may be introduced therethrough.

The strap 620 may be connected to both ends of the main body 710. The strap 620 may be flexible so as to be wrapped around a user's wrist. The strap 620 may be composed of a first strap and a second strap which are separated from each other. One ends of the first strap and the second strap are connected to the main body 610, and the other ends thereof may be connected to each other via a connecting means formed thereon. In this case, the connecting means may be formed as magnetic connection, Velcro connection, pin connection, and the like, but is not limited thereto. Further, the strap 620 is not limited thereto, and may be integrally formed as a non-detachable band.

Figure 8:
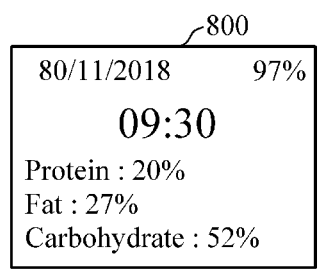
FIG. 8 is a diagram illustrating an estimated physiological status which is provided for a user through a display.

A display (800 of FIG. 8), such as the display of FIG. 8, may be disposed on an upper surface of the main body 610 to visually display a variety of information. The display (800 of FIG. 8) may include a touch screen panel for receiving a touch input.

The main body 610 may include a module for performing a general function of the electronic device 600, a light source for estimating a biomarker concentration, a detector. A battery may be mounted in the main body 610 or the strap 620 to supply power to various modules. In addition, the processor, the storage, the communication interface, the humidity sensor, the temperature sensor, etc., which are described above with reference to FIGS. 1A and 1B, may be mounted therein. A detailed description thereof will be omitted.

Referring to FIG. 7, a smartphone is illustrated as an example of the electronic device 700, which includes a main body 710, the inlet 310, the movement channel 320, through a biomarker moves, the chamber 330, the insertion part 340, and the sensor cartridge 200*a* inserted into the insertion part 340.

While FIG. 7 illustrates the inlet 310 formed on the upper part of the side surface of the main body 710, the inlet 310 is not limited thereto, and may be formed at various positions, such as a rear surface of the main body 710, or one surface of the main body 710 except the upper part of the side surface of the main body 710, and the like.

In FIG. 7, the inlet 340 and the chamber 330 are disposed at the same distance from the side surface of the main body 710, but the inlet 340 is not limited thereto and may be disposed at a position further away from the side surface of the main body 710 than the chamber 330.

A display for visually displaying a variety of information may be disposed on a front surface of the main body 710. The display may include a touch screen panel for receiving a touch input.

FIG. 8 is a diagram illustrating an estimated physiological states which is provided for a user through a display 800. The display 800 may be disposed on one surface of a wearable device, such as an upper surface of a smart watch, a front surface of a smartphone, and the like. While the display 800 of FIG. 8 displays only the estimated physiological status, an estimated concentration of a biomarker may also be displayed on the display 800.

The display 800 may continuously display a biomarker concentration estimation result and/or a physiological status estimation result for a predetermined period of time (e.g., 8 hours). Alternatively, if the biomarker concentration estimation result and/or the physiological status estimation result exceed a predetermined threshold value, the display 800 may generate and provide warning information for a user.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An apparatus for estimating a concentration of a biomarker, the apparatus comprising:
    an inlet configured to receive the biomarker of an object;
    a chamber configured to store the biomarker;
    an insertion portion in fluid communication with the chamber;
    a sensor cartridge in the insertion position and into which the biomarker is introduced from the chamber and comprising a measurement channel provided as a porous substrate, the measurement channel comprising a probe which is disposed in each pore of the porous substrate and changes in color upon reaction with the biomarker;
    a light source configured to emit light onto the measurement channel;
    a detector configured to detect the light incident from the measurement channel; and
    a processor configured to obtain color change information of the measurement channel based on the light detected by the detector, and estimate the concentration of the biomarker based on the color change information,
    wherein the processor is further configured to:
        set a reference absorbance; and
        obtain a color change speed of the measurement channel based on a distance between a first position in the measurement channel at which the reference absorbance is detected and a second position, different from the first position, in the measurement channel at which the reference absorbance is detected, and a time difference between a first detection time of the first position and a second detection time of the second position.

2. The apparatus of claim 1, wherein the inlet comprises a hole provided to be contacted by the object, or a permeable membrane configured to selectively transmit the biomarker to be measured.

3. The apparatus of claim 1, wherein the insertion portion comprises a slot into which the sensor cartridge is inserted or from which the sensor cartridge is removed, and configured to guide the sensor cartridge to the chamber when the sensor cartridge is inserted into the slot.

4. The apparatus of claim 3, wherein the slot extends toward a side surface of the chamber.

5. The apparatus of claim 3, wherein the slot is provided above the chamber so that the sensor cartridge that is inserted into the slot is disposed above the chamber.

6. The apparatus of claim 5, wherein the processor is further configured to obtain a variation in absorbance of the measurement channel based on a quantity of light detected from the measurement channel and a quantity of light detected from a reference channel.

7. The apparatus of claim 1, wherein the porous substrate comprises at least one of silica, alumina, polymer, and molecular sieve.

8. The apparatus of claim 1, wherein the biomarker comprises at least one of acetone, ammonia, carbon dioxide, and hydrogen.

9. The apparatus of claim 1, wherein the processor is further configured to estimate a physiological status comprising at least one of nutrient intake status, metabolic status, exercise status, calorie intake, and calorie consumption.

10. The apparatus of claim 9, further comprising a display configured to display at least one of the concentration of the biomarker and the physiological status.

11. The apparatus of claim 1, further comprising at least one of a humidity sensor configured to measure humidity, and a temperature sensor configured to measure temperature.

12. An apparatus for estimating a concentration of a biomarker, the apparatus comprising:
a sensor configured to be attached to an object and react with the biomarker, and comprising
a contact surface configured to be contacted by the object,
a sensor cartridge disposed above the contact surface and comprising a measurement channel provided as a porous substrate, the measurement channel comprising a probe which is disposed in each pore of the porous substrate and changes in color upon reaction with the biomarker, and
a hole provided at the contact surface and the sensor cartridge, to receive the biomarker;
a light source configured to emit light onto the sensor;
a detector configured to detect light incident from the sensor; and
a processor configured to obtain color change information of the sensor based on the detected light, and estimate the concentration of the biomarker based on the obtained color change information,
wherein the processor is further configured to:
set a reference absorbance; and
obtain a color change speed of the measurement channel based on a distance between a first position in the measurement channel at which the reference absorbance is detected and a second position, different from the first position, in the measurement channel at which the reference absorbance is detected, and a time difference between a first detection time of the first position and a second detection time of the second position.

13. The apparatus of claim 12, wherein the processor is further configured to obtain the color change speed of the measurement channel based on a first distance between the first position and the second position, and a second distance between a third position and a fourth position in the measurement channel, at each of which the reference absorbance is detected when the sensor cartridge reacts with the biomarker introduced through an outer edge of the sensor cartridge.

14. The apparatus of claim 13, wherein the processor is further configured to calculate a statistical value of the first distance and the second distance, and obtain the color change speed based on the statistical value of the first distance and the second distance.

15. The apparatus of claim 12, wherein the processor is further configured to measure a variation in absorbance of the measurement channel based on a quantity of light detected at a predetermined reference point of the sensor and a quantity of light detected from the measurement channel.

16. The apparatus of claim 12, further comprising a transparent cover surface disposed above the contact surface, wherein the transparent cover surface comprises marker lines formed so that at least one of a position of the measurement channel and the color change information is visually identified.

17. An electronic device comprising:
an inlet provided to be contacted by an object, and through which a biomarker of the object is introduced;
a chamber configured to store the biomarker;
a sensor cartridge into which the biomarker is introduced from the chamber and comprising a measurement channel provided as a porous substrate, the measurement channel comprising a probe which is disposed in each pore of the porous substrate and changes in color upon reaction with the biomarker;
a slot configured to guide the sensor cartridge to the chamber when the sensor cartridge is inserted into the slot;
a light source configured to emit light onto the measurement channel;
a detector configured to detect the light incident from the measurement channel; and
a processor configured to obtain color change information of the measurement channel based on the light detected by the detector, and estimate a concentration of the biomarker based on the color change information,
wherein the processor is further configured to:
set a reference absorbance; and
obtain a color change speed of the measurement channel based on a distance between a first position in the measurement channel at which the reference absorbance is detected and a second position, different from the first position, in the measurement channel at which the reference absorbance is detected, and a time difference between a first detection time of the first position and a second detection time of the second position.

* * * * *